Aug. 14, 1962     V. A. RUSSELL     3,049,431
CERAMIC MATERIAL OF HIGH DIELECTRIC STRENGTH CONTAINING
BARIUM TITANATE AND METHOD OF MANUFACTURING
Filed Dec. 7, 1959
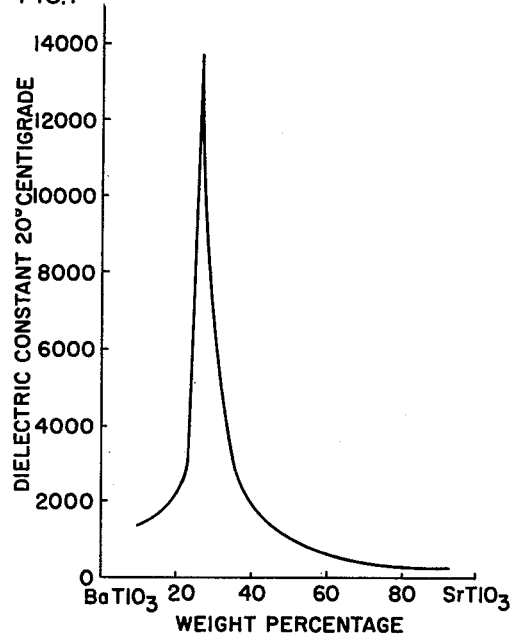
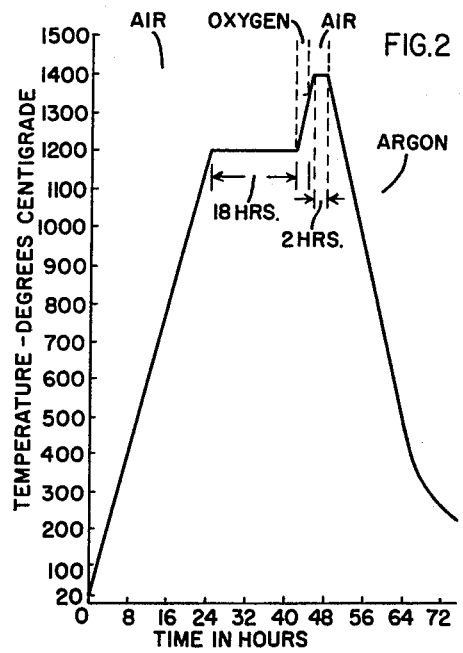
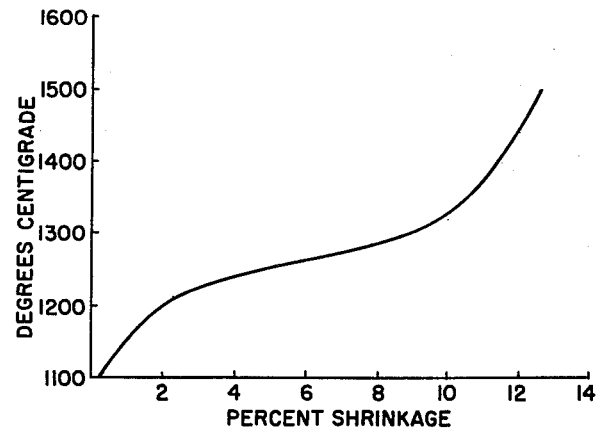
INVENTOR:
VIRGINIA A. RUSSELL,
BY *Marvin L. Goldenberg*
HER ATTORNEY.

3,049,431
CERAMIC MATERIAL OF HIGH DIELECTRIC STRENGTH CONTAINING BARIUM TITANATE AND METHOD OF MANUFACTURING
Virginia A. Russell, Syracuse, N.Y., assignor to General Electric Company, a corporation of New York
Filed Dec. 7, 1959, Ser. No. 857,905
10 Claims. (Cl. 106—39)

This invention relates to novel ceramic materials having both a high dielectric strength and a high dielectric constant and to a novel method of manufacturing such material. More particularly this invention relates to ceramic materials containing barium titanate, which have the above improved properties, and to a method of manufacturing such materials, whereby the density thereof is maximized.

The materials to which the invention relates are particularly applicable to high energy storage capacitors capable of storing large quantities of energy in small volumes. Since they have substantially increased dielectric strengths, additional applications may be made of such materials. For example, they may be useful in miniaturization techniques wherein it is desired to minimize the structural dimensions of capacitors of high capacitance, or they may find use as voltage sensitive capacitors having an extended range of operation.

The total energy input to a capacitor is given by the expression:

$$W_c = \frac{1}{C}\int_0^Q q\, dq = \frac{Q^2}{2C} = \frac{V^2 C}{2}$$

where V is the potential which the capacitor finally acquires and C is the capacitance. Recognizing that the capacitance of a parallel plate capacitor may be expressed as:

$$C = \frac{Q}{V} = \frac{\epsilon A}{4\pi t},$$

where A is the area of the capacitor plates, $t$ is the thickness of the dielectric material therebetween and $\epsilon$ is the dielectric constant, the energy to the capacitor may be expressed as:

$$W_c = \frac{V^2 C}{2} = \frac{V^2 A \epsilon}{8\pi t} = \frac{V^2}{t^2} \times At \times \frac{\epsilon}{8\pi}$$

In this equation we recognize $V/t$ is the voltage per unit thickness of the dielectric and $At$ is the volume of the dielectric. Therefore, the energy per unit volume of a capacitor may be expressed as:

$$W_e = k \times E^2 \epsilon$$

where E is equal to $V/t$, which is the electric field strength. If $W_e$ is expressed in joules/in.$^3$ and E is in volts/mil, $k = .1125 \times 10^{-6}$. Thus, it is seen that the energy input to a capacitor is equal to a constant times the square of the field strength multiplied by the dielectric constant. Since the maximum electric field strength possible is the dielectric strength of the dielectric material, the energy capable of being stored by a capacitor is maximized by making the product of the square of the dielectric strength and the dielectric constant a maximum.

It is known that titanate ceramic materials composed of a quantity of barium titanate and a quantity of strontium titanate in proportions of 60–80% $BaTiO_3$ and 40–20% $SrTiO_3$ by weight exhibit a high dielectric constant, as high as 14,000 at 20° C. By employing materials of high intrinsic dielectric constant, such as the aforementioned, and then providing a further improvement of the dielectric constant and a substantial improvement of the dielectric strength of these materials, an exceedingly high energy storage capability is realized.

The intrinsic dielectric strength of high dielectric constant ceramics theoretically is very high, but in practice it is found in many of these materials to be relatively low presumably because of certain flaws present in the material. It is reasoned that the elimination or lessening of these flaws should result in a greatly improved dielectric strength. The flaws of paramount interest to the invention are the small voids or pores present in the material, and to some extent the unwanted conducting particles that are found to be present.

It is accordingly an object of the invention to provide a novel and improved method for manufacturing an improved ceramic material having an increased dielectric strength and an increased dielectric constant.

A further object of the invention is to provide a novel and improved method for manufacturing an improved barium strontium titanate ceramic material having an increased dielectric strength and an increased dielectric constant.

Another object of the invention is to provide a novel and improved method for the manufacture of a barium strontium titanate ceramic material which permits an increase in the density property thereof.

A still further object of the invention is to provide a novel and improved barium strontium titanate ceramic material having an increased dielectric strength and dielectric constant for application to high energy storage capacitors and for application to voltage sensitive capacitors having an extended range of operation.

These and other objects of the invention are achieved by firing a composition of barium strontium titanate, typically composed of 65% by weight of barium titanate and 35% by weight of strontium titanate, to a temperature of 1150–1200° C. in an atmosphere of air and sustaining the material at that temperature for a prolonged period. The material is then elevated to a higher temperature of approximately 1350° in an oxygen atmosphere. The material continues to be fired in air to 1450° at which temperature it is sustained for approximately 2 hours and then cooled in an inert atmosphere, thereby increasing the density of the composition and improving both the dielectric strength and the dielectric constant of the material.

Although the features of the invention which are believed to be novel are set forth with particularity in the appended claims, the invention itself both as to its organization and method of operation together with further objects and advantages thereof, may best be understood by reference to the following description taken in connection with the accompanying drawings wherein:

FIGURE 1 is a graph showing variations of the dielectric constant with various percentage compositions of barium strontium titanate material;

FIGURE 2 is a graph showing a typical firing cycle employed in improving the dielectric strength and dielectric constant of ceramic materials such as those of FIGURE 1;

FIGURE 3 is a graph showing the percentage of shrinkage plotted as a function of temperature for a typical sample of barium strontium titanate material; and FIGURE 4 is a graph showing a plot of the density versus the temperature of oxygen removal for a typical sample of barium strontium titanate material.

It is noted that the density of materials of the type under consideration has been shown to be directly related to the dielectric strength thereof and thus the latter, as well as the dielectric constant, may be appreciably improved by increasing the material density. The invention, although applicable generally to the crystalline oxidic ceramics, is specifically concerned with optimizing the process for increasing the density so as to obtain the highest possible value for a given (Ba, Sr) $TiO_3$ material.

In the fabrication of the barium strontium titanate, (Ba, Sr) $TiO_3$, a higher density and thus an improved dielectric strength and also an improved dielectric constant is obtained in a material of a composition of 60–80% by weight of $BaTiO_3$ and of 40–20% by weight of $SrTiO_3$. This range is known to have high dielectric constants as is shown in FIGURE 1. Within this range a composition of 65% barium titanate and 35% strontium titanate has been found to give the best electrical characteristics for high energy storage. It also has a relatively low Curie temperature, about −10° C., which avoids unwanted polarization effects.

In the initial mixing step for combining these two constituents, the raw materials thereof, in the form of a fine powder, are mixed wet in a ball mill, approximately 40% by weight of water being added to the mixture before milling. By way of example, the ball milling is performed in a mill, such as porcelain mill with smooth porcelain balls about 1 inch in diameter, for a period of two hours. After the milling operation, the thoroughly mixed material is removed from the mill, dried in an oven at about 80° C., and passed through a 20 mesh screen, having 20 divisions per inch, so as to crumble any large lumps which may have formed. About 4% water is then added for binding and the material is pelletted by being again passed through a 20 mesh screen. Other binders can be employed such as Methocel or a polyvinyl alcohol. Water is generally preferable because of its greater purity. After screening the pelletted material is formed into bars or discs by being pressed in a die. The bars or discs are then placed in an oven and rapidly fired in an initial firing step to a temperature of approximately 1300° C. It is maintained at this temperature for approximately two hours and then cooled. This is termed the calcining step, in which a solid solution of the two materials is formed whereby the barium titanate lattice shrinks and is integrated with the strontium titanate. The calcining step precedes the final critical firing and results in obtaining a better mixture, in reducing the water absorption propensity to essentially zero, and in obtaining a higher final density of the material. It is desirable to reduce the absorption of the material to minimize the conduction characteristics thereof. The above specified temperature and period have been found to be optimum in contributing the noted desirable properties while prohibiting any significant grain growth, which is undesirable since it weakens the material.

The very hard solid solution formed by the calcining is broken down by a mortar and pestle and passed through a four mesh screen. The pieces are then placed in the ball mill and rolled dry for 4 to 5 hours, after which they are removed, broken down again if necessary and passed through a 20 mesh screen. These smaller pieces are next put in a second ball mill which is lined with a plastic material to reduce contamination. Smaller balls than before are used and some water is added, 40% by weight. This final milling is for a period of 15 hours. The solution is next removed as a slurry and dried in an oven. The solution is now in the form of a powder in which the particles are no larger than 5 microns. A 4% by weight water binder is mixed with the solution and the final pieces pressed by dies into discs or other shapes as desired. The samples under consideration are discs having a diameter ranging from less than 1 inch to greater than 8 inches, and being $\frac{1}{10}$ inch to ½ inch in thickness. The dies exert a pressure sufficient to compact the material, normally of approximately 2 to 5 tons per square inch.

After being formed, the compacted discs are ready for a final firing which has been shown to increase the density of the ceramic material to as high as 98.7% of the theoretical density. The firing may be performed in a sealed globar-heated Harper Kiln or a comparable furnace having good temperature control. The larger discs are mounted in the furnace by being placed upon a zirconium oxide tile, which material will not react with the barium strontium titanate. The zirconium oxide tile is mounted on a supporting base of alumina with slabs of alumina placed on four sides of the discs. The samples may be stacked in this manner in tiers for a depth that is accommodated by the furnace. Thus, the discs are evenly heated by the energy radiated from the furnace sides which indirectly strikes them. Smaller 1 inch samples are similarly mounted in a tube which is placed in the furnace, being laid side by side instead of stacked.

The samples, after being inserted into the furnace, are heated slowly in an air atmosphere to a temperature of approximately 1150–1200° C. Heating at a 50° C. per hour for the samples under consideration has been found to be desirable, effecting an even heating and acting to prevent cracking. A typical firing cycle for the one inch samples is shown in FIGURE 2. For this firing cycle the sintering process commences to become appreciable at approximately a temperature of 1150–1200° C. This is shown in the graph of FIGURE 3 in which shrinkage versus temperature is plotted. In the temperature range where sintering begins to become appreciable but is not yet rapid, a fixed temperature is sustained, which is referred to in the art as soaking. Thus, at this stage the sample is given a long soak. For compositions of 60–65% $BaTiO_3$ and 40–35% $SrTiO_3$, a soak temperature of 1200° C. has been found to be the most effective for increasing the density, although soaking at 1150° C. for a longer period yields comparable results. The 1 inch discs, which are slightly less than ¼ inch in thickness, have been soaked for a period of 18 hours with optimum results, providing in excess of a 1% density increase. Five inch disc samples ½ inch in thickness have a firing cycle similar to FIGURE 1 except that a soak of 45 hours has been found to be optimum. The soak time is a function of the thickness of the samples and for the best results will approximate 20 hours per ¼ inch thickness, although a prolonged soak of considerably less time, for example in excess of two hours per ¼ inch thickness, also will increase the density in many instances.

The thermal energy of the material particles at the sintering temperatures provides an agitation of said particles, which have assumed plastic properties due to the heating, having the effect of drawing them closer together and compacting the material. The long soak permits trapped pores between the particles to escape and thereby further compacts the material and improves the density. This is made possible as a result of the slight agitation of the particles during the commencement of the sintering action. It is critical that the long soak be applied after the sintering action has begun and preferably when it is just beginning to be appreciable. At the soak temperatures where sintering is relatively slow, the length of the soak time required for an effective density increase is inversely related to the rapidity of the sintering action. However, if the soak is applied at too high a temperature, as for example 1250° where the sintering action is rapid, the compacting of the material by the hastened sintering will trap the inner pores and will not allow them to escape. The soak will then have little effect. It is noted also that the effectiveness of the long soak has been found to vary with the stoichiometry of the barium titanate materials, being more effective for those with excess $TiO_2$. The following table shows the improvement in density that has been obtained as a result of a long soak, the material otherwise being identically fired through the entire cycle.

TABLE NO. 1

*Density Improvement Resulting From Long Soak at Low Sintering Temperatures*

| Sample 1″ diam., ¼″ thick—60-65% $BaTiO_3$, 35-40% $SrTiO_3$ | Density g/cc | | | |
|---|---|---|---|---|
| | No Soak | 1,100° C., 18 Hr. | 1,200° C., 18 Hr. | Theor. |
| A. 65% $BaTiO_3$, 35% $SrTiO_3$ | 5.42 | 5.44 | 5.45 | 5.678 |
| B. 65% $BaTiO_3$, 35% $SrTiO_3$ | 5.36 | 5.36 | 5.42 | 5.678 |
| C. 65% $BaTiO_3$, 35% $SrTiO_3$ | 5.47 | 5.50 | 5.52 | 5.678 |
| D. 60% $BaTiO_3$, 40% $SrTiO_3$ | 5.31 | 5.40 | 5.52 | 5.647 |

When the long soak is completed, the material is heated to a temperature of between 1340–1370° C. in an atmosphere of oxygen. The rise rate is approximately 50° C. per hour as before, as shown in FIGURE 2. The oxygen is applied at a rate of 80 liters per minute for a furnace capacity of 2½ cubic feet in the case of 5 inch samples, and at a rate of 1 liter per minute for 1 inch samples in a tube 2 inches by 2½ feet. The density of the ceramic material is further increased by the application of the oxygen atmosphere. It is theorized that the application of the oxygen atomsphere causes the inner pores essentially to be filled with oxygen, which oxygen is then diffused through the barium strontium titanate lattice to the outside as the material is compacted, thus readily permitting a reduction in the size of the pores and further compacting the material.

Although the application of the oxygen atmosphere generally increases the density, in order for a maximum density to be obtained, it has been found that the oxygen must be removed before the maximum heating temperature of the firing cycle is reached, the optimum removal temperature for most samples being 1350° C. This is clearly shown in FIGURE 4 and Table No. 2.

TABLE NO. 2

[Density vs. $O_2$ removal temperature]

| Sample—60% $BaTiO_3$, 40% $SrTiO_3$ | $O_2$ Removal, ° C. | Density, g./cc. |
|---|---|---|
| A1 | 1,300 | 5.422 |
| B1 | 1,330 | 5.565 |
| C1 | 1,350 | 5.585 |
| D1 | 1,375 | 5.581 |
| E1 | 1,400 | 5.579 |
| F1 | 1,450 | 5.574 |

Except for the differing oxygen removal temperature, all of the samples were fired identically.

Referring again to FIGURE 2, after the oxygen atmosphere has been removed, the material is heated in an air atmosphere to between 1420° and 1450° C. to substantially complete the sintering action at which temperature it is soaked for 1 to 4 hours, preferably 2 hours. A final soak at 1450° C. has been found to be the optimum treatment for allowing the sample to heat uniformly and completely without appreciably increasing the grain size of the material which reduces its strength.

The samples are then cooled in an inert atmosphere, such as argon or nitrogen. The cooling rate is approximately the same as the heating rate. The passing of the inert gas over the samples reduces the excess oxygen in and around the samples, performing as an aspirator in reducing the oxygen pressure at the outside of the structure, thus removing the excess or uncombined oxygen from the sample. It is desirable to reduce any excess oxygen so as to decrease the conductivity created thereby and maintain the material strength. Application of the inert gas also changes the color of the barium strontium titanate samples from a dark brown to a light straw color, also making them translucent in thicknesses up to about ⅜″. Thus, there is given a visual indication of the effectiveness of the process in removing excess oxygen and in reducing the conductivity of the material. After the samples are cooled to room temperature they are removed from the furnace.

Table No. 3 shows the increase in density obtained with an oxygen atmosphere as opposed to an air atmosphere for samples of (Ba, Sr) $TiO_3$ materials in the composition range of the present invention, in this instance 60% $BaTiO_3$ and 40% $SrTiO_3$. For each sample the difference in firing was in the atmosphere applied only.

TABLE NO. 3

[Oxygen atmosphere vs. air atmosphere]

| Sample | Atmosphere | Density, g/cc. | Percent Theor. Density |
|---|---|---|---|
| A2 | $O_2$ | 5.45 | 96.5 |
| | Air | 5.28 | 93.5 |
| B2 | $O_2$ | 5.45 | 96.5 |
| | Air | 5.27 | 93.3 |
| C2 | $O_2$ | 5.55 | 98.2 |
| | Air | 5.40 | 95.8 |
| D2 | $O_2$ | 5.57 | 98.7 |
| | Air | 5.32 | 94.2 |
| E2 | $O_2$ | 5.570 | 98.7 |
| | Air | 5.33 | 94.5 |
| F2 | $O_2$ | 5.56 | 98.5 |
| | Air | 5.35 | 94.7 |

It is seen upon examination of Table No. 3 that exposing the ceramic material to oxygen atmosphere rather than an air atmosphere improves the density considerably, a maximum density of 98.7% of the theoretical lensity being attained. In common usage, high density ceramics are defined to be those above 97.5% of theoretical; the medium density range includes 96.5–97.5%; and all below 96.5% are considered to be of low density.

It is noted that in these ranges slight percentage increases in density result in very considerable increases in dielectric strength. This is clearly seen in Table No. 4.

TABLE NO. 4

*Effect of Increased Density on Dielectric Strength*

[Density vs. dielectric strength]

| Sample Designation | Density, g./cc. After Firing | Breakdown (volts/mil) |
|---|---|---|
| A3. 65% $BaTiO_3$, 35% $SrTiO_3$ | 5.41 | 122 |
| B3. 65% $BaTiO_3$, 35% $SrTiO_3$ | 5.44 | 142 |
| C3. 65% $BaTiO_3$, 35% $SrTiO_3$ | 5.46 | 190 |
| D3. 60% $BaTiO_3$, 40% $SrTiO_3$ | 5.49 | 270 |
| E3. 65% $BaTiO_3$, 35% $SrTiO_3$ | 5.56 | 291 |
| F3. 65% $BaTiO_3$, 35% $SrTiO_3$ | 5.57 | 295 |
| G3. 65% $BaTiO_3$, 35% $SrTiO_3$ | 5.59 | 350 |
| H3. 65% $BaTiO_3$, 35% $SrTiO_3$ | 5.59 | 342 |

Thus, an increase in density of about 3.3% results in an increase in dielectric strength of 180%.

It has also been found that an increase in density of from 94% to 98.5% has increased the dielectric constant from 1900 to 2300, an improvement of 21%. Therefore, after being subjected to the foregoing novel process, these materials are found to exhibit an exceedingly high dielectric strength and dielectric constant.

Such materials have particular application to high energy storage capacitors and to the miniaturization of capacitors. In addition, they are applicable to non-linear voltage sensitive capacitor devices wherein the range of operation is appreciably extended.

Although the method described herein has been specific to the barium titanate ceramics, it may be also applicable to many crystalline oxidic ceramic materials. The appended claims are intended to include this and all such modifications of the method and materials disclosed which do not constitute departures from the spirit and scope of the invention.

What I claim as new and desire to secure by Letters Patent of the United States is:

1. A method of improving the dielectric strength and dielectric constant of a ceramic solid material containing at least 60% barium titanate comprising the steps of firing the solid in an oxygen atmosphere, substantially decreasing the oxygen content of the atmosphere at a predetermined temperature before attaining a maximum heating temperature, said maximum heating temperature being selected at a point where the sintering action is substantially completed so that the material density is made a maximum without causing an appreciable increase in the grain size of the material, finally soaking in said decreased oxygen content atmosphere at said maximum heating temperature, and finally cooling the solid in an inert atmosphere for the removal of excess oxygen.

2. A method of improving the dielectric strength and dielectric constant of a ceramic solid material containing at least 60% barium titanate comprising the steps of firing the solid to a first temperature at which the sintering action takes place at a rate sufficiently slow so as to allow the escape of trapped pores, further increasing the temperature while firing the solid in an oxygen atmosphere, substantially decreasing the oxygen content of the atmosphere at a second temperature before attaining a maximum heating temperature, said maximum heating temperature being selected at a point where the sintering action is substantially completed so that the material density is made a maximum without causing an appreciable increase in the grain size of the material, soaking in said decreased oxygen content atmosphere at said maximum heating temperature and finally cooling the solid in an inert atmosphere for the removal of excess oxygen.

3. A method of improving the dielectric strength and dielectric constant of a ceramic solid material containing at least 60% barium titanate comprising the steps of firing the solid to a first temperature at which the sintering action takes place at a rate sufficiently slow so as to allow the escape of trapped pores, soaking in a partial oxygen atmosphere at that temperature for a prolonged period to permit the escape of a maximum number of trapped pores thereby providing an increase in density of the material, further increasing the temperature while firing the solid in a substantially increased oxygen atmosphere, substantially decreasing the oxygen content of the atmosphere at a second temperature before attaining a maximum heating temperature, said maximum heating temperature being selected at a point where the sintering action is substantially completed so that the material density is made a maximum without causing an appreciable increase in the grain size of the material, soaking in said decreased oxygen content atmosphere at said maximum heating temperature and finally cooling the solid in an inert atmosphere for the removal of excess oxygen.

4. A method of forming a ceramic material according to claim 3 in which said prolonged period is in excess of two hours.

5. A method of forming a ceramic material according to claim 4 in which said first temperature is in a range of 1150–1200° C., said second temperature is in a range of 1340–1370° C., and said maximum temperature is in a range of 1420–1450° C.

6. A method of improving the dielectric strength and dielectric constant of a ceramic material containing a solid solution of 60–80% barium titanate and 40–20% strontium titanate comprising the steps of firing the solution in an air atmosphere to a first temperature in the range of 1150–1200° C. at which the sintering action takes place at a slow rate, further increasing the temperature while firing the solution in an oxygen atmosphere, removing the oxygen atmosphere and reapplying said air atmosphere at a second temperature in the range of 1340–1370° C., continuing the firing of said solution in an air atmosphere to a maximum heating temperature of 1420–1450° C., soaking in said air atmosphere at said maximum heating temperature to substantially complete the sintering action, and finally cooling the solution in an inert atmosphere for the removal of excess oxygen.

7. A method of forming a ceramic material of high dielectric strength and high dielectric constant from a solid solution of barium titanate and strontium titanate comprising the steps of firing the solution in an air atmosphere to a first temperature at which the sintering action takes place at a rate sufficiently slow so as to allow the escape of trapped pores, soaking at said first temperature for a prolonged period to permit the escape of a maximum number of trapped pores thereby providing an increase in density of the material, further increasing the temperature while firing the solution in an oxygen atmosphere, removing the oxygen atmosphere and reapplying said air atmosphere at a second temperature before attaining a maximum heating temperature, said maximum heating temperature being selected at a point where the sintering action is substantially completed so that the material density is made a maximum without causing an appreciable increase in the grain size of the material, soaking in said air atmosphere at said maximum heating temperature and finally cooling the solution in an inert atmosphere for the removal of excess oxygen.

8. A method of forming a ceramic material according to claim 7 in which said first temperature is in the range of 1150–1200° C., said second temperature is in the range of 1340–1370° C. and said final heating temperature is in the range of 1420–1450° C.

9. A method of forming a ceramic material of high dielectric strength and high dielectric constant from a solid solution composed of 65% by weight of barium titanate and 35% by weight of strontium titanate comprising the steps of firing said solution in an air atmosphere to a first temperature in the range of 1150–1200° C. at which the sintering action takes place at a slow rate, soaking at said first temperature for a prolonged period to permit the escape of trapped pores thereby providing an increase in density of the material, further increasing the temperature while firing the solution in an oxygen atmosphere, removing the oxygen atmosphere and reapplying said air atmosphere at a second temperature in the range of 1340–1370° C., continuing the firing of said solution in an air atmosphere to a maximum heating temperature of 1420–1450° C., soaking in said air atmosphere at said maximum heating temperature and finally cooling the solution in an inert atmosphere for the removal of excess oxygen.

10. A method of forming a ceramic material of high dielectric strength and high dielectric constant from a solid solution composed of 65% by weight of barium titanate and 35% by weight of strontium titanate comprising the steps of prefiring a mixture of the constituent elements of said material at a temperature of about 1300° C. so as to form a solid solution, cooling said solution, slowly firing said solution in an air atmosphere to a temperature of about 1200° C., soaking at this temperature for a prolonged period to permit the escape of trapped pores thereby providing an increase in the density of the material, further increasing the temperature while firing said solution in an oxygen atmosphere, removing the oxygen atmosphere and reapplying said air atmosphere at a temperature of about 1350° C., continuing the firing of said solution to a maximum temperature of about 1450° C., soaking in said air atmosphere at said maximum temperature and finally cooling the solution in an argon atmosphere for the removal of excess oxygen.

(References on following page)

References Cited in the file of this patent

UNITED STATES PATENTS

| | | |
|---|---|---|
| 2,443,211 | Wainer et al. | June 15, 1948 |
| 2,469,584 | Wainer et al. | May 10, 1949 |
| 2,563,307 | Burnham et al. | Aug. 7, 1951 |
| 2,584,324 | Bousky | Feb. 5, 1952 |
| 2,626,220 | Thurnauer et al. | Jan. 20, 1953 |
| 2,768,901 | Tombs | Oct. 30, 1956 |
| 2,966,420 | Prokopowicz et al. | Dec. 27, 1960 |

OTHER REFERENCES

Fensham: J. Am. Chem. Soc., volume 76 (1954), "Solid Solutions of $Li_2O$ in NiO," pages 969–71.

Walker: J. Am. Ceramic Soc., volume 38, No. 6, June 1, 1955, "Mechanism of Material Transport During Sintering," pages 187–197.

Egerton et al.: J. Am. Cer. Soc., vol. 38, November 1955, pages 412–418.

Rosenthal et al.: Ceramic Bulletin, volume 37, No. 8, August 1958, pages 370–375, "A Study of Process Variables in Barium Titanate Ceramics.